US012786090B2

(12) United States Patent
Billor et al.

(10) Patent No.: US 12,786,090 B2
(45) Date of Patent: Nov. 3, 2026

(54) MONITORING FOR INCONSISTENT LATENCY IN DATA CENTERS

(71) Applicant: Microsoft Technology Licensing, LLC, Redmond, WA (US)

(72) Inventors: Denizcan Billor, Seattle, WA (US); Tristan Naoki Struthers, New York, NY (US); Yang Zheng, Redmond, WA (US); Jamie Gaudette, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 566 days.

(21) Appl. No.: 17/735,501

(22) Filed: May 3, 2022

(65) Prior Publication Data

US 2023/0362083 A1 Nov. 9, 2023

(51) Int. Cl.
*H04L 43/0888* (2022.01)
*H04L 12/46* (2006.01)

(52) U.S. Cl.
CPC ...... *H04L 43/0888* (2013.01); *H04L 12/4633* (2013.01)

(58) Field of Classification Search
CPC ............ H04L 43/0888; H04L 12/4633; H04L 43/0805; H04L 43/0864; H04L 43/087; H04L 43/10; H04L 41/0893; H04L 41/145; H04L 43/0852; H04L 43/0876; H04L 43/16; H04L 43/20; H04L 45/121; H04L 45/16; H04L 45/24; H04L 43/50
See application file for complete search history.

(56) References Cited

U.S. PATENT DOCUMENTS 10,735,292 B1 * 8/2020 Klavon .................. H04L 47/20
2013/0151032 A1 * 6/2013 Kraeling ............ H04L 12/4633 701/1
2013/0259056 A1 * 10/2013 Kotrabasappa ......... H04L 45/28 370/389
2015/0341273 A1 11/2015 Naouri et al.
2016/0112292 A1 * 4/2016 Ahuja ................ H04L 67/1097 709/212
2019/0312815 A1 * 10/2019 Altman ............ H04W 28/0236
(Continued)

OTHER PUBLICATIONS

"International Search Report and Written Opinion Issued in PCT Application No. PCT/US23/013556", Mailed Date: Jun. 1, 2023, 13 Pages.

(Continued)

*Primary Examiner* — Kwang B Yao
*Assistant Examiner* — Patrick Yipao Pei

(57) ABSTRACT

Systems, methods, and software are disclosed herein for discovering inconsistent latencies in data center environments. In an implementation, a method for detecting inconsistent latency in a network comprises generating test traffic comprising encapsulated packets to transmit along a route from a source device to a destination device and supplying the test traffic to a bundle of interfaces of the source device to transmit to the destination device over multiple physical paths. The method continues with identifying latencies of the encapsulated packets along the route, and identifying an occurrence of inconsistent latency with respect to the bundle of interfaces based at least on the latencies of the encapsulated packets.

20 Claims, 8 Drawing Sheets

(56) References Cited

U.S. PATENT DOCUMENTS

| | | | |
|---|---|---|---|
| 2021/0126854 A1 | 4/2021 | Guo et al. | |
| 2022/0006726 A1 | 1/2022 | Michael et al. | |
| 2022/0029906 A1 | 1/2022 | Mahesh et al. | |
| 2022/0179588 A1* | 6/2022 | Pu | G06F 12/0246 |
| 2022/0182326 A1* | 6/2022 | Gamage | H04L 43/10 |
| 2022/0312270 A1* | 9/2022 | Raleigh | H04W 28/02 |
| 2024/0267324 A1* | 8/2024 | Hao | H04L 45/12 |

OTHER PUBLICATIONS

Communication pursuant to Article 94(3) EPC Received for EP Application No. 23712383.1, mailed on May 6, 2026, 8 pages.

* cited by examiner

MONITORING FOR INCONSISTENT LATENCY IN DATA CENTERS

TECHNICAL FIELD

Aspects of the disclosure are related to the fields of computing and communications and, in particular, to monitoring for latency anomalies in data centers.

BACKGROUND

Modern technology services rely upon a complex array of computing hardware and software to deliver their digital products, services, and platforms over the Internet. Data centers house computing and network connectivity equipment and are typically staffed by a team of operators and engineers. Networks connect the computers inside a given data center to each other, as well as to the outside world—including to end users and to other data centers. Low latency between such elements is often key to delivering a high-quality customer experience Latency is the time it takes network traffic to travel from one point on the network to another, while round-trip latency is the time it takes for traffic to travel from one point to another, and back again. Many tools exist for monitoring latency, but challenges exist with respect to quantifying latency to a sub-millisecond level. For example, ping tests can be administered to determine the latency of a link, but they are subject to control plane policy and the performance of the local processors at each hop along a path.

Precise latency measurements are important with respect to modeling the availability of a datacenter environment and meeting uptime commitments. A hindrance to accurate modeling and sustained uptime is when the physical links in a bundle of connections have inconsistent latencies. Such situations can occur when the underlying physical paths in a bundle diverge from one another, thereby introducing inconsistent latencies In a brief example, a datacenter customer may have numerous servers installed within a datacenter environment. Normally, it may be presumed that the cabling connecting one bundle of interfaces on one to device to another bundle on another device traverse the same physical path. As such, the latency experienced by each individual interface should generally match that of the other interfaces in the bundle. However, it is possible for one or more of the links to take a different physical path from one end of the route to the other, thereby introducing latency anomalies that could be detrimental to the service(s) provided by the customer.

Overview

Technology is disclosed herein that improves the ability of operators to detect inconsistent latencies across interface bundles in data center networks. Various implementations described below employ a latency process on one or more computing devices. The process identifies anomalous latency measurements and allows a source (or sources) of the anomalous latency to be identified. The latency process may be employed locally with respect to a user experience (e.g., on a user's device), remotely with respect to the user experience (e.g., on a server/router/switch), or distributed between or amongst multiple devices.

In various implementations, such computing devices include one or more processors operatively coupled with one or more computer readable storage media. Program instructions stored on the one or more computer readable storage media, when executed by the one or more processors, direct the computing device carry out various steps with respect to a representative latency process. For example, the computing device generates test traffic including encapsulated packets to transmit along a route from a source device to a destination device. The test traffic is supplied to a bundle of interfaces of the source device to transmit to the destination device over multiple physical paths. The latencies of the encapsulated packets along the route may then be identified and analyzed to detect any occurrences of inconsistent latency with respect to the bundle of interfaces.

Various technical effects may be appreciated from the implementations disclosed herein, including the ability to discover a link having a latency that is inconsistent with respect to the latency of similar links. Steps may then be taken to either rectify the inconsistent latency and/or adjust traffic flows to account for the inconsistent latency. In addition, utilizing encapsulated packets provides the ability to identify a source of the inconsistent latency with improved precision. In some implementations, the inconsistent latency can be determined with sub-millisecond accuracy.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Technology is disclosed herein that provide capabilities for detecting inconsistent latencies on network paths. In an implementation, encapsulated packets are utilized to measure the latency from one interface bundle on a network device to the other side of the bundle on another downstream device. The latency of segments along the route from the source device to the destination device can be analyzed by virtue of the encapsulated packets, as well as the round-trip latency of the route from the source device to a destination, and back.

In addition, a technique may be employed whereby the source addresses of the encapsulated packets are varied such that they are broadly distributed across the multiple interfaces of the source device. In an example, the last octet of the source address is varied, which influences a routing algorithm that picks the outgoing interface on a device. Varying the source addresses ensures that the test packets traverse all of the interfaces of a given device and as such, travel over all of the physical links connected to the device.

Latency can be measured based on the time an encapsulated packet is sent from a source device and the time the final decapsulated packet is received at the source device, having traversed a path to a final destination and back again. The individual latencies calculated for each encapsulated packet can be analyzed for excessive jitter, the presence of which is indicative of multiple physical paths.

That is, the presence of excessive jitter represented in the latency measurements for packets sent from a particular bundle of interfaces means that some of the packets may be taking a different physical path than others of the packets. Otherwise, jitter would be minimal since all of the packets would be taking the same physical path. The presence of jitter beyond a threshold amount can trigger an alert and/or automatic traffic adjustments so that traffic flows belonging to a particular customer or tenant can be routed over physical links with similar latencies.

Various technical effects may be appreciated from the present discussion such as the ability to spread test traffic over all interfaces of a device by modifying the source address of the traffic. Such an effect ensures that all of the interfaces on a device are adequately sampled and analyzed, thereby avoiding a situation where one link goes unexamined and unremedied. In addition, utilizing encapsulated packets allows the necessary latency measurements to be taken at a low layer of each device along a route, as opposed to in the control plane or application space of a given device. Such a low-layer technique allows latency to be inferred with sub-millisecond precision or accuracy, which matters in the context of high-speed datacenter connections. The use of encapsulated packets also allows for round-trip measurements, as well as the ability to measure the latency of different segments along a route.

Figure 1:
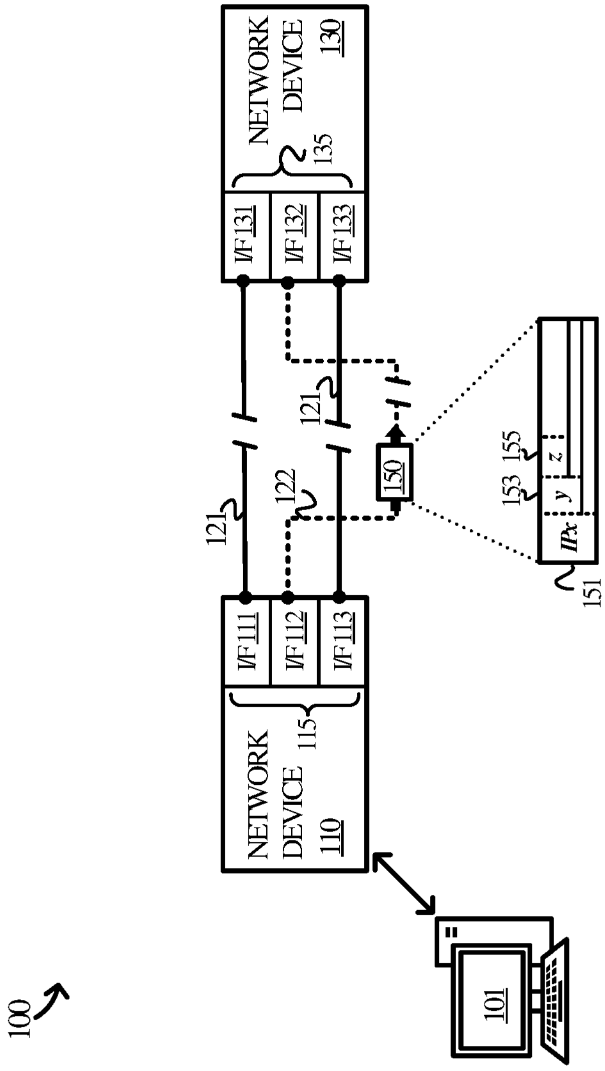
FIG. 1 illustrates an operational environment in an implementation.

Referring now to the drawings, FIG. 1 illustrates an operational environment 100 in an implementation. Operational environment 100 includes user computer 101, network device 110, and network device 130. Network device 110 and network device 130 are each representative of devices capable of sending and receiving packet traffic, example of which include servers, routers, switches, and the like. User computer 101 is representative of any computing device capable of connecting remotely with network device 110 and/or network device 130 for the purpose of latency analysis as disclosed herein.

Network devices 110 and 130 are able to send and receive traffic by virtue of physical paths from one device to another. Each network device includes multiple physical interfaces (e.g., network cards) that are coupled to media via which they transmit electrical and/or optical signals encoded with packet traffic. For example, network device 110 includes interfaces 111, 112, and 113, which represent an interface bundle 115, while network device 130 includes interfaces 131, 132, and 133, which also represent an interface bundle 135. Each interface connects to one end of a physical link that itself connects to another interface on another downstream device.

A given link may directly connect network device 110 to network device 130, but more often, the devices are indirectly connected due to the presence of other devices along the physical paths between the devices. For example, there may be numerous other devices along a physical path from network device 110 to network device 130 such as switches, routers, relays, patch panels, and the like. In addition, the paths taken by each physical link may differ relative to the other links in a bundle. Unfortunately, a user of the network devices may not have visibility into the physical plant that provides the connectivity and thus often will not know whether all of the paths in a given bundle take the same path. And as mentioned above, differences in the physical paths taken by traffic on a bundle can cause latency inconsistencies that are detrimental to the provisioning and delivery of digital services.

Figure 6:
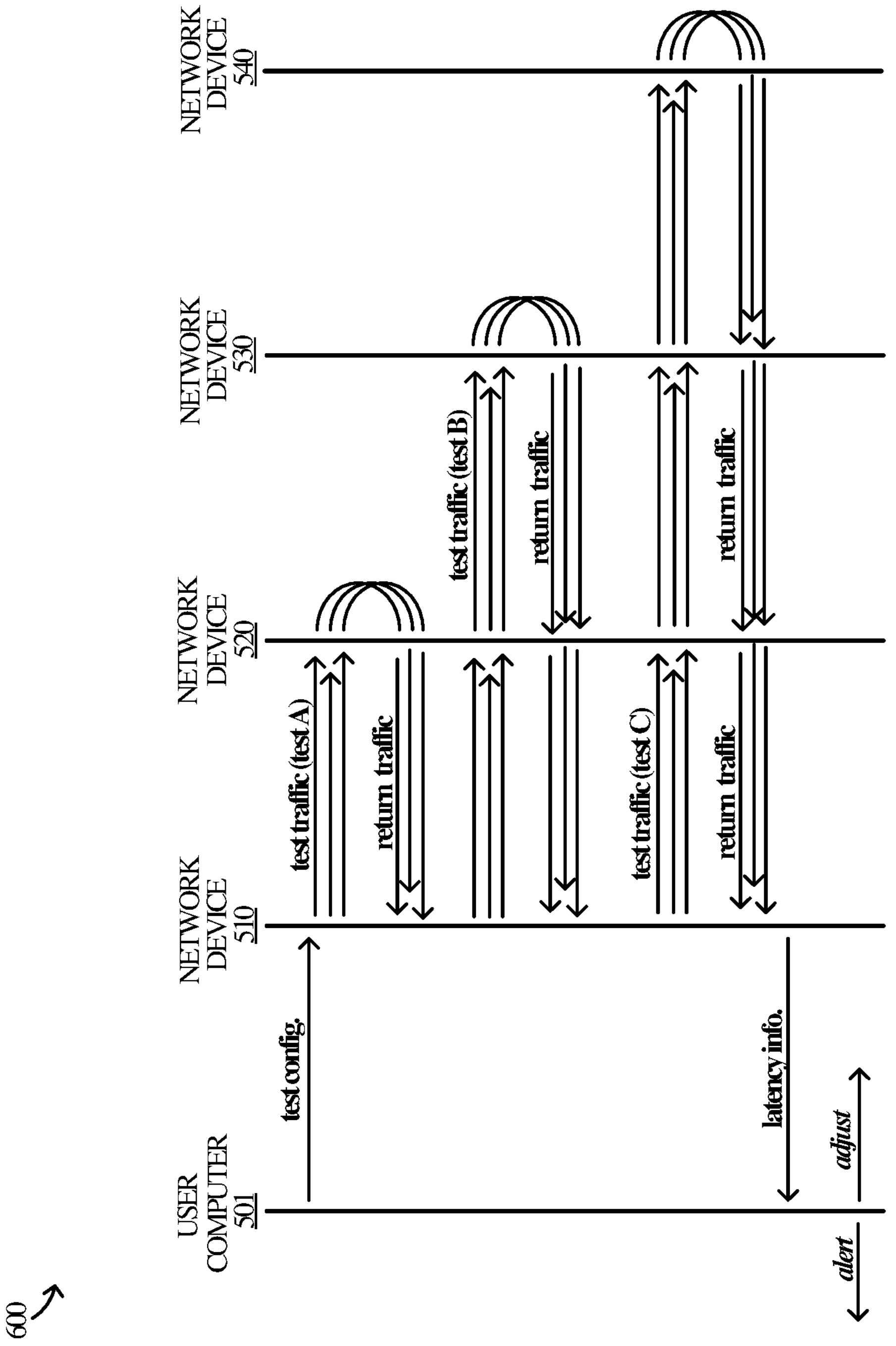
FIG. 6 illustrates an operational scenario in an implementation.

To mitigate against the occurrence of inconsistent latencies, user computer 101 includes a probe application capable of interfacing with any network device (e.g., network device 110) to test and measure latencies in a network. User computer 101 connects remotely to network device 110 and generates test traffic that allows it to probe the latency characteristics of any bundles in a network. The computing device is able to measure round-trip time and infer latency on a particular segment or link by subtracting the latency of a vantage point from that of a destination. Examples of user computer 101 include personal computers, desktop computers, laptop computers, tablet computers, mobile phones, and any other suitable devices, of which computing device 601 in FIG. 6 is broadly representative.

Figure 2:
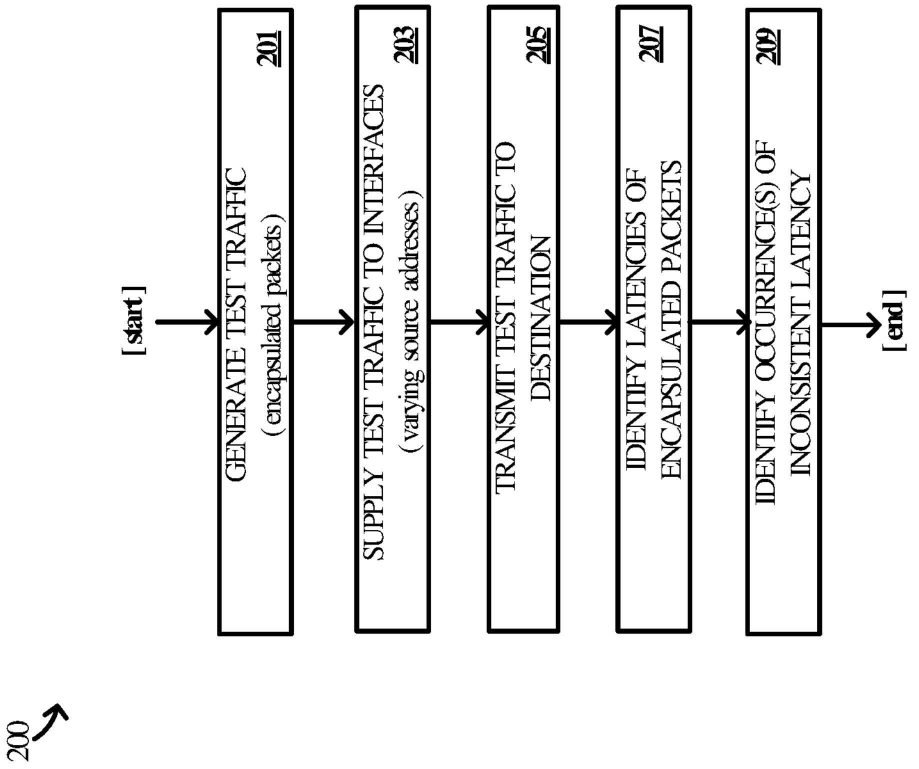
FIG. 2 illustrates a latency process in an implementation.

User computer 101 includes one or more software applications capable of connecting remotely to network device 110 and initiating the testing and analysis of network traffic. As mentioned, network device 110 is representative of a router, switch, or other such device capable of sending and receiving traffic and as such, includes a suitable computing architecture of which computing device 601 in FIG. 1 is also broadly representative. User computer 101 and network device 110 function in a cooperative fashion to employ a latency process for the purpose of testing network latency, of which latency process 200 in FIG. 2 is broadly representative.

Latency process 200 may be implemented in program instructions in the context of any of the hardware, software, and/or firmware modules, components, or other such elements of network device 110 and/or user computer 101. In other words, latency process 200 may be implemented entirely by network device 110, or in a distributed manner between both network device 110 and user computer 101. Regardless, the program instructions, when executed by one or more processors of a suitable computing device, direct the computing device to operate as follows, referring to a computing device in the singular for purposes of clarity.

In operation, the computing device generates test traffic to transmit along a route from a source device to a destination device, and back to the source device (step 201). The test traffic includes encapsulated packets that each have multiple packets encapsulated within each other such that each hop along the route strips an outer layer from each packet and forwards a remainder of the packet to a destination indicated by an inner layer of the packet.

The computing device supplies the test traffic to a bundle of interfaces to transmit to the destination device over multiple physical path (step 203). This may be accomplished by, for example, providing the encapsulated packets internally to a load balancer that distributes the traffic amongst the interfaces. In some implementations, the load balancer employs a routing algorithm such as an equal cost multi-path (ECMP) strategy to determine which interfaces to use for a given packet. The source address of the packets may be varied randomly, pseudo-randomly, or in some other manner to ensure a relatively broad distribution of the traffic across all interfaces so that the latency of all of the physical paths can be evaluated. In some scenarios, it is the last octet of the network address that is varied.

Next, the computing device transmits the test traffic to its destination (step 205). Each packet is encapsulated such that the network address of at least one intermediate hop is encoded in the outer packets of the encapsulated packets, while the network address of the ultimate destination is encoded in an inner packet of the encapsulated packets. The innermost packets are encoded with a network address of the source device so that the traffic is ultimately routed back to the source. Each interface transmits the packets allocated to it onto the physical link to which it is connected. The encapsulated packets flow out from the interfaces downstream to a next device on the line, and so on until the packets reach their destination. Each router or other such network device at each hop on the route receives a given packet, strips the packet of its outer encapsulation, and forwards the remainder of the packet to its next destination.

The next hop processes the packets in the same manner, until a given packet has reached its destination and returned to the source. At the source, the sent time will have been recorded for each of the packets, as will have the received time. The computing device is therefore able to collect all of the timing information for the encapsulated packets and identify the latencies of the individual packets (step 207). The computing device analyzes the latency information to identify any occurrences of inconsistent latency amongst the physical paths of the route (step 209).

In some implementations, anomalous latencies are identified by comparing the jitter measured across the interfaces in a bundle to a threshold amount of jitter (e.g., 5 milliseconds). If the actual jitter exceeds the threshold amount of jitter, then the bundle is flagged as potentially connecting to a physical plant that differs for at least one of the interfaces. In some scenarios, jitter is the standard deviation of latency measurements. Thus, for the jitter of a bundle to exceed a threshold, the standard deviation of all latency measurements for the bundle would need to exceed the threshold, indicating that a substantial variance exists amongst the interfaces of the bundle. In contrast, if all of the interfaces of a bundle connected to the same physical plant, then little to no variance would be experienced and the standard deviation of latency measurements would not exceed the threshold. The computing device may signal an alert or other such message upon discovering such latency anomalies. In the same or other scenarios, the computing device may be programmed to take remedial actions such as by re-routing customer traffic to other devices or other physical links, so as to ensure consistent latency for a given customer's traffic.

Figure 3:
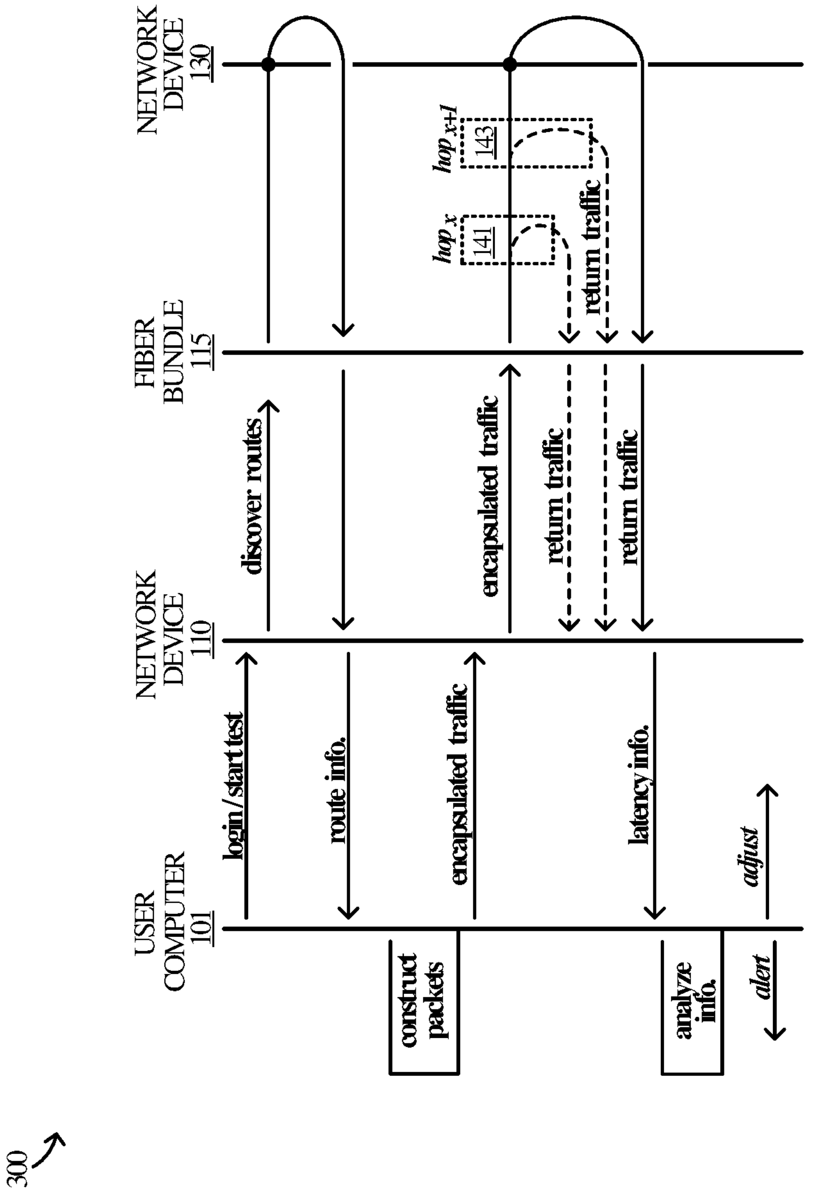
FIG. 3 illustrates an operational scenario in an implementation.

FIG. 3 illustrates a brief operational example 300 of latency process 200 as employed with respect to operational environment 100 in FIG. 1. In operation, a user engaged with user computer 101 operates its software to configure a latency scan of interfaces 111, 112, and 113 on network device 110. Alternatively, the scans could be configured in an automated or semi-automated manner. User computer 101 connects remotely to network device 110 and proceeds to perform a scan of the routes from network device 110 to network device 130. The scan returns the network address for any devices interposed between the two devices. It may be appreciated that any number of hops could connect network devices 110 and 130, although they may also be directly connected with no network hops in-between.

User computer 101, in conjunction with network device 110, proceeds to generate test traffic to send on interfaces 111, 112, and 113 to network device 130. The test traffic includes encapsulated packets having outermost packets addressed to a next hop (if any) along the route, an inner packet addressed to network device 130 (if it isn't addressed in the outermost packet), and the innermost packets addressed to source device 120. Encapsulated packet 150 is representative of any such encapsulated packet and includes an outermost packet 151, an inner packet 153, and an innermost packet 155.

Each packet encapsulated within the overall packet includes a header and a payload. The header identifies the hop to which the packet is to be sent, while the payload includes the header and payload of the next packet. For example, the outermost packet 151 specifies a destination address of 'x,' while inner packet 153 specifies destination address 'y,' and the innermost packet specifies destination address 'z.' Encapsulated packet 150 will therefore be sent to the network device at address 'x,' then to the device at address 'y,' and finally to the network device with address 'z.' Encapsulated packets ensure that the test traffic will follow specific network routes while also capturing timestamp information at a very low layer of each network device (as opposed to in the control plane or user space of the devices).

The source address of the packets depends on which element originates the traffic. In some scenarios, network device 110 may be the origin of the test traffic, meaning that the source address of the traffic is the network address associated with network device 110. In other scenarios, user computer 101 may be the origin of the test traffic, in which case, the network address of user computer 101 would serve as the source address of the test traffic.

In either case, user computer 101 (or network device 110) varies the source address of the test traffic while suppling the traffic to interfaces 111, 112, and 113. A load balancing function internal to network device 110 routes or otherwise distributes the encapsulated packets across the interfaces based on a hash of the source address of each of the encapsulated packets. Were the source addresses to remain unchanged, the load balancer would route all of the packets to the same interface because the hash function would produce the same result for each packet. Varying the source addresses therefore results in varied results of the hash function, and therefore a more balanced distribution of the packets across the interfaces.

Each interface transmits its allocated packets on the link to which it connects, examples of which include fiber optic cabling, copper cabling, and other suitable media. Each link traverses a physical path which may be the same as the paths taken by the other links or may differ relative to the other paths. Here, it is assumed for illustrative purposes that interface 111 and interface 113 connect to links that take the same physical path 121 through a data center at least to a next hop along the route to network device 130, if not all the way to network device 130. In contrast, interface 112 connects to a link that take takes a different physical path 122 through the data center.

The paths may differ for a number of reasons that can cause latency anomalies. For example, the type of cabling used to connect to an interface may differ in quality or capacity relative to the cabling used to connect to other interfaces, thereby causing latency differences. In another example, switch panels or other connective components in the data center may differ. At the network layer, the physical links may connect to different devices entirely, such that traffic on one path takes a different route than traffic on another route. For example, interfaces 111 and 113 could connect to a downstream router, while interface 112 might connect to a different downstream router. Such divergence could continue or even increase further downstream.

Any one or more of these differences amongst physical paths could cause or otherwise contribute to latencies that differ substantially enough be considered inconsistent or anomalous. For instance, jitter of 5 (five) milliseconds or greater across the interfaces would be indicative of at least one of the interfaces experiencing a latency that is inconsistent or anomalous with respect to the latency experienced by the other interfaces in the bundle. In other words, the existence of a threshold amount of jitter associated with a bundle of interfaces indicates that the interfaces connect to multiple physical paths.

User computer 101 (or network device 110) calculates the jitter based on latency measurements derived from the encapsulated packets sent to network device 130 and returned to network device 110. Each encapsulated packet is sent from one network device to the next based on the destination address in the outermost layer of the encapsulated packet. The next-hop device to which a packet is sent strips the packet of its then-outermost layer and forwards the remainder of the packet to the next address indicated in the now-outermost layer of the packet. Here, the packets traverse at least two intermediate hops 141 and 143 before reaching network device 130. Alternatively, a given packet could have either one of the two intermediate hops 141 and 143 as its destination.

The packet eventually arrives at network device 130 and is sent back to network device 110 by virtue of the layering of packets within each other. Network device 130 strips the received packets of their outermost layers and sends transmits them to the next hop (e.g., hop x+1), and so on until the packets are finally received by network device 110. User computer 101 can determine the total latency of the encapsulated packet by calculating the difference between the time the encapsulated packet was sent by network device 110 and the time the packet was received by network device 110.

The latencies of individual segments along the route can be determined by targeting the two ends of a segment with different flows. To do so, test traffic can be sent to one end of a segment along, while other test traffic can be sent to the other end of the segment. The latency of the segment can therefore be calculated by subtracting the respective latencies of the traffic from each other. For example, the latencies of the sub-paths between two intermediate devices along the route from network device 110 to network device 130 can be collected. Those latencies can then be analyzed to determine whether a threshold amount of jitter exists that is indicative of multiple physical paths being used to connect a bundle of interfaces.

Figure 4:
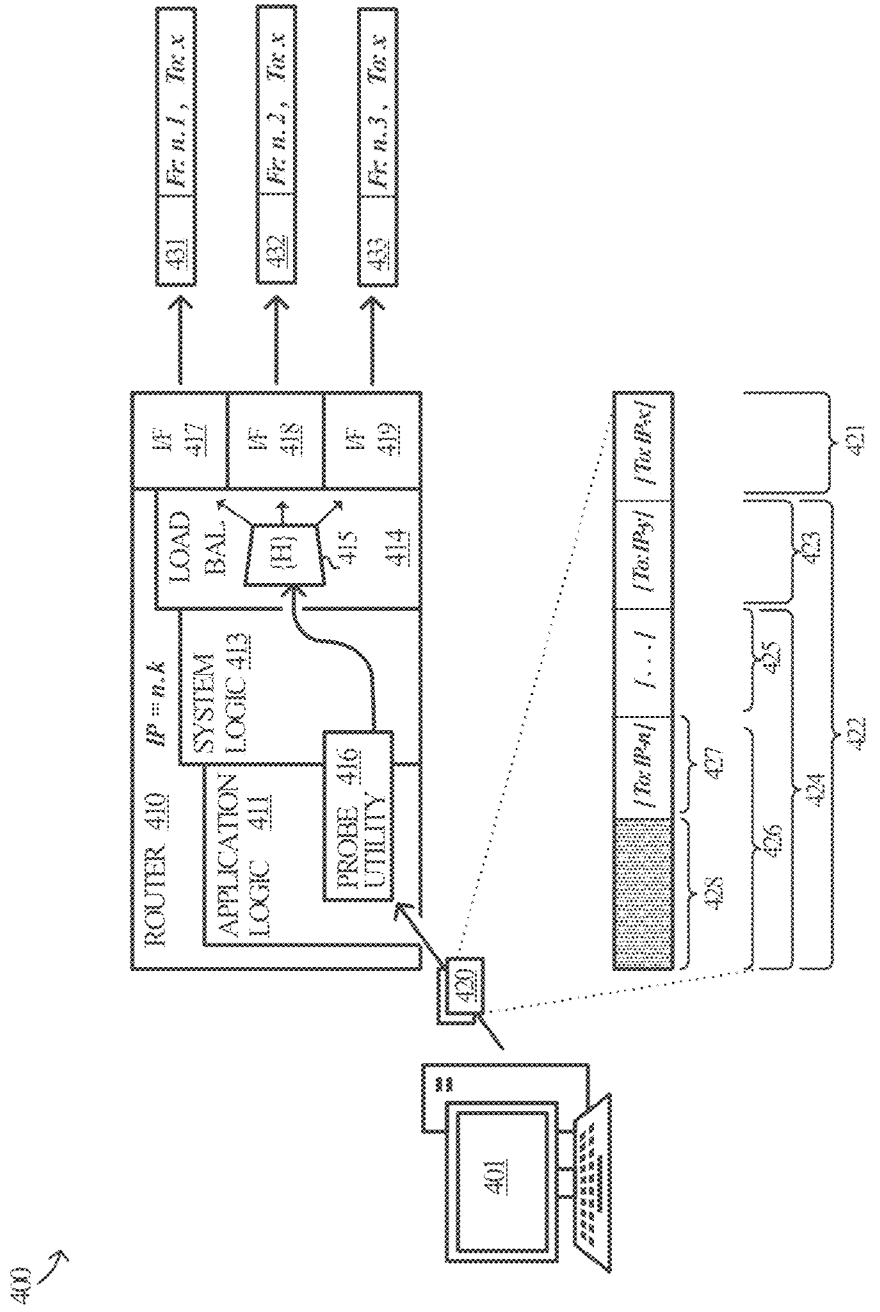
FIG. 4 illustrates a monitoring architecture in an implementation.

FIG. 4 illustrates a monitoring architecture 300 an in implementation. Monitoring architecture 400 includes user computer 401 and router 410. User computer 401 is representative of any suitable computing device for connecting to router 410 for the purposes of latency testing and analysis. Router 410 is representative of any network device having multiple interfaces capable of transmitting packets on physical paths. Router 410 includes application logic 411, system logic 413, and load balancer 414. Router 410 also includes multiple interfaces, represented by interface 417, interface 418, and interface 419. Examples of interfaces 417, 418, and 419 include network interface cards (NIC).

Application logic 411 represents one or more software or firmware applications that may reside on router 410 and that run on top of an operating system layer provided by system logic 413. Accordingly, system logic 413 is representative of one or more operating system components or other lower-layer components that provide services to upper-layer logic. Probe utility 416 is representative of one such program that allows user computer 401 to connect to router 410 for the purpose of configuring and running latency tests. Probe utility 416 may be implemented entirely in application space, entirely in system space, or as a combination of the two types of program space.

Probe utility 416 ultimately connects to load balancer 414 in order to supply test traffic to interfaces 417, 418, and 419. Load balancer 414 is representative of any hardware, firmware, and/or software component(s) capable of distributing outgoing packet traffic to interfaces 417, 418, 419. Load balancer 414 may be implemented as an application-specific integrated circuit (ASIC) in some implementations and includes a hash module 415 for routing the packets amongst interfaces 417, 418, and 419. Hash module 415 may also be implemented in hardware, firmware, and/or software and employs a hash function that takes a source address of a packet as input, and outputs a hash value that is determinative of which interface will be fed the packet. In a highly simplified view, hash module 415 takes all or a portion of a source address as input and outputs one of three values that correspond to the three interfaces. The hash function employed by hash module 415 may be designed such that it only has a limited number of outputs for a wide range of inputs such as network addresses. In an optimal situation, the hash function is selected and configured such that a relatively equal distribution of packets is achieved for a range of source addresses, allowing each interface and its corresponding physical path(s) to be adequately probed and analyzed.

The physical paths are interrogated by sending encapsulated packets to each of the interfaces to transmit on their respective physical links. Other than the source addresses (which are varied), each set of encapsulated packets are essentially the same. That is, each packet is addressed to the same outer destination and inner destination(s), as applicable. In this example, interfaces 417, 418, and 419 are illustrated as transmitting encapsulated packets 431, 432, and 433 respectively. Each packet is addressed to the same network address 'x,' but their source addresses are different. For example, the source address of encapsulated packet 431 is n.1, while those of encapsulated packets 432 and 433 are n.2 and n.3, respectively. These addresses are intended to demonstrate how varying a last portion of a source address causes load balancer 414 to distribute the packets evenly across the interfaces. The 'n' portion of the addresses is intended to represent the first octets of an Internet protocol (IP) address, while the '.k' portion is intended to represent the last octet of the IP address, which can be varied to affect the balanced distribution of packets. While the addresses illustrated herein generally relate to IPv4 addresses, it may be appreciated that the same or similar concepts could apply to IPv6 addresses.

Encapsulated packets 431, 432, and 433 each represent highly simplified views of such packets, whereas probe packet 420 represents a more detailed (yet still simplified) view of an encapsulated packet. Probe packet 420 is representative of an encapsulated packet that may be generated by software on user computer 401 for purposes of probing for inconsistent latencies through interfaces 417, 418, and 419. Probe packet 420 includes four (4) packets encapsulated within each other. A first packet—or the outermost packet—includes a header 421 and a payload 422. The header section includes at least a destination address for the packet ('x') and optionally other header information such as a source address, a protocol version indicator, and a flag indicating the packet is an IP-in-IP packet. The payload carries (or encapsulates) the other packets.

The next packet is an inner packet itself having a header 423 and a payload 424. The header 423 carries the same information as in header 421, except that the destination address relates to a downstream hop along the route (address 'y'). The payload 424 includes the innermost packet, which also includes a header 425 and a payload 426. The header 425 represents any of other intermediate destination addresses or the destination address for the last hop in the route. The payload 426 is populated with another header 427 and payload 428. Header 427 holds the network address of the source device (router 410), while payload 428 could be left empty or populated with null values.

Probe packet 420 may be generated by user computer 401 and sent to probe utility 416 to be injected or otherwise supplied to interfaces 417, 418, and 419. Alternatively, user computer 401 could supply the relevant information with which probe utility 416 could generate the encapsulated packet. While only one probe packet is disclosed herein, it may be appreciated that multiple probe packets could be constructed, especially when multiple end-to-end routes are targeted for testing. In addition, while only three encapsulated packets 431, 432, and 433, are illustrated, it may be appreciated that a sufficient volume of test traffic is generated and transmitted from interfaces 417, 418, and 419 to allow for a sufficient number of latency measurements to be captured and analyzed. Moreover, different flows of the test traffic could be constructed such that individual segments of a route could be targeted and tested for inconsistent latencies. The different segments are tested by targeting one traffic flow to one end of a segment, while another traffic flow is targeted to the other end of the segment. The latencies captured with respect to the one end of the segment can be subtracted from the latencies captured with respect to the other end of the segment to arrive at latency measurements for the segment.

Figure 5A:
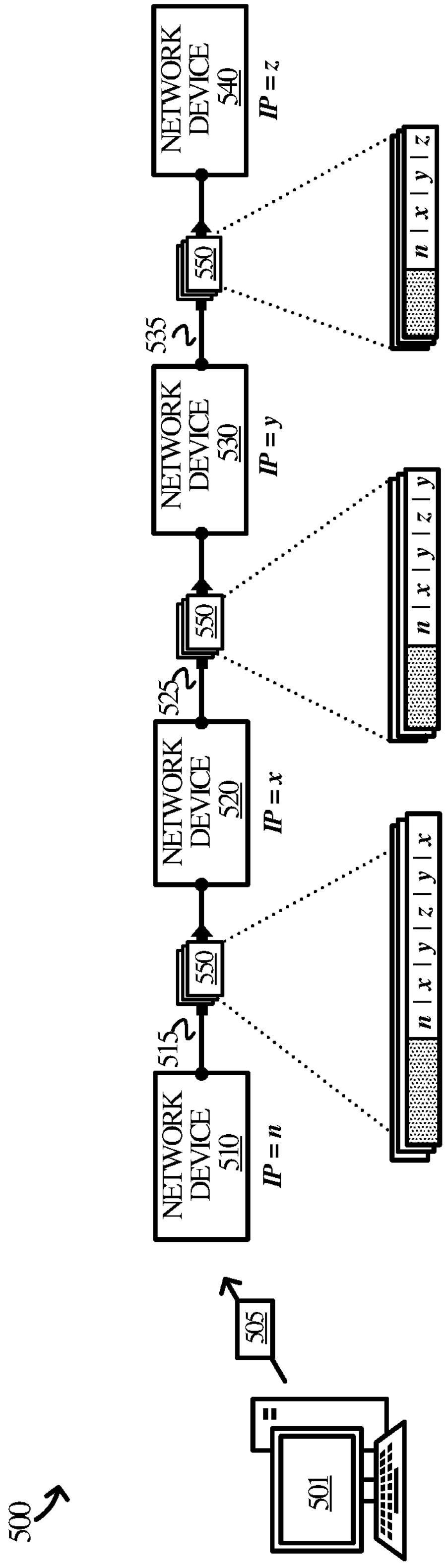
FIGS. 5A and 5B illustrate an operational environment in an implementation.
Figure 5B:
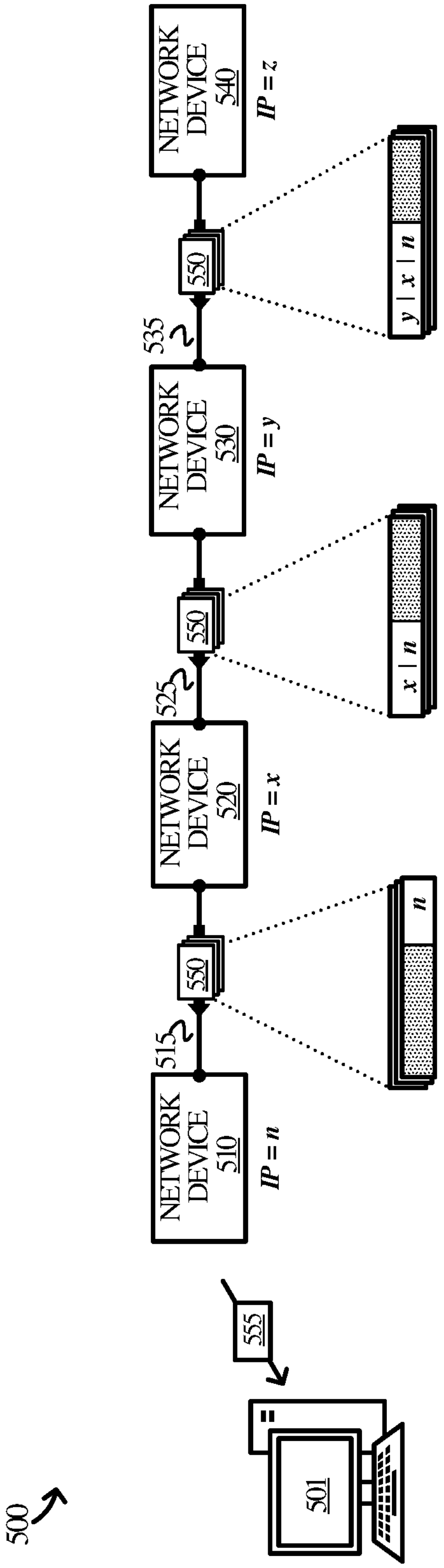

FIGS. 5A and 5B illustrate another operational environment and example scenario to demonstrate how multiple segments of a route can be probed for inconsistent latencies caused by diverse physical paths. Operational environment 500 includes a user computer 501, network device 510, network device 520, network device 530, and network device 540. Network devices 510, 520, 530, and 540 are each representative of a router, switch, or other such network device.

Each network device is physically connected to another network device by a data path, represented by data paths 515, 525, and 535. Each data path is formed by two opposing interface bundles—one on each network devices. For example, network device 510 is connected to network device 520 by data path 515. A link access group (LAG) bundle on network device 510 forms one end of data path 515, while a LAG bundle on network device 520 forms the other.

Each data path may be comprised of one or more physical paths. That is, each data path utilizes multiple physical links since each bundle consists of multiple physical interfaces such as those illustrated in FIG. 1. However, whether the physical links that form a data path each take the same physical path is unknown and, as discussed at length above, can impact the latencies seen by the interfaces in a given bundle. Accordingly, a scan for inconsistent latencies on data path 515, as well as on data path 525 and data path 535 will reveal whether the physical links that provide each data path take consistent paths with respect to each other. This is accomplished by software on user computer 501, as well as network device 510.

FIG. 5A illustrates the encapsulation and decapsulation of test traffic that is sent on an outbound path along a route from network device 510 to network device 540. To test the latency along the entire route, the encapsulated packets 550 have an outermost address 'x' corresponding to the address for network device 520, followed by 'y' and 'z.' These first layers of encapsulation will ensure that the packets are routed to network device 540. However, each outer layer is stripped from the packets at each hop, such that the encapsulated packets 550 sent from network device 520 are addressed to 'y,' while those sent by network device 530 are addressed to 'z.' FIG. 5B illustrates the corresponding flow of the inbound traffic to network device 510. The inbound traffic sent by network device 540 is addressed to 'y,' while the traffic sent by network device 530 is addressed to 'x.' Finally, with all of the outer layers having been stripped along the outbound and inbound paths, the encapsulated packets 550 are addressed to 'n,' which is the network address of the source device (network device 510). Latency measurements 555 can be provided to user computer 501.

FIG. 6 illustrates an exemplary operational scenario with respect to operating environment 600. In operation, user computer 501 connects to a probe utility on network device 510 and configures a scan of one or more segments of a route from network device 510 to network device 540. Configuring the scan includes providing instructions 505 to network device 510 for the test. The instructions 505 identify the values with which to generate encapsulated packets such as the source and destination addresses of each packet. In some implementations, user computer 501 may generate and send the encapsulated packets itself such that user computer 501 is the source of the packets.

Here, the instructions 505 specify three different tests (A, B, and C) using four destination addresses for the encapsulated packets x, y, z, and n. The different tests allow each segment to be targeted. Test A targets the portion of the route between network device 510 and network device 520, while test B targets the portion of the route between network device 510 and network device 530, and test C targets the entire route between network devices 510 and 540. Their respective latencies can then be subtracted from each other to arrive at the latencies for the individual segments along the route.

Network device 510 generates the encapsulated packets 550 in accordance with the instructions provided by user computer 501 and transmits the packets onto data path 515 via its LAG bundle. The source address of the packets will be varied so that they are evenly distributed over the interfaces of network device 510. With respect to test A, the encapsulated packets include at least two packets encapsulated within each other: an outermost packet addressed to network device 520, and an innermost packet addressed to network device 510, to facilitate the round-trip journey of the packet. With respect to test B, the encapsulated packets include at least three packets encapsulated within each other: an outermost packet addressed to network device 520, an inner packet addressed to network device 530, and an innermost packet addressed to network device 510. With respect to test C, the encapsulated packets include at least four packets encapsulated within each other: an outermost packet addressed to network device 520, an inner packet addressed to network device 530, another inner packet addressed to network device 540, and an innermost packet again addressed to network device 510. It may be appreciated that the packets for each of the tests may include other inner packets allowing the return path to be controlled as granularly as the outbound path.

At each hop along the route, the network device that receives the encapsulated packets strips them of their outer headers and forwards them on to the next hop associated with the next address in the header. The packets traverse the identified hops, ultimately traveling round-trip from network device 510, to their respective destinations, and back to network device 510. User computer 501 captures the sent times of each pack and the received times of each packet from the perspective of network device 510, allowing user computer 501 to calculate the respective latencies for each encapsulated packet that was sent by network device 510 in the context of each test.

User computer 501 calculates the latencies for each data path and analyzes them to determine whether any given path experienced anomalies that may indicate that multiple physical paths undergird the data paths. In addition, performing the multiple tests allows user computer 501 to ascertain the latencies of individual segments of the route. For example, the latencies captured as part of test A can be subtracted from those of test B to determine the latencies of the path segment between network device 530 and network device 520. Similarly, the latencies captured as part of test B can be subtracted from those of test C to determine the latencies of the path segment between network device 540 and network device 530. If such inconsistencies are discovered, an alert may be generated and communicated to operations personnel so that they can take corrective action. In some scenarios, corrective action may be taken automatically, such as by shifting customer traffic onto specific interfaces that are known to have consistent latencies with respect to each other.

Root-cause analysis can also be performed to determine which specific interface is experiencing the most latency. To do so, the latency measurements can be analyzed on a per-address basis with respect to the specific source address of the outgoing traffic. Since the last octet of the source addresses will vary at network device 510, and since the packets are distributed to the interfaces on network device 510 based on their source addresses, a relationship or pattern will exist that allows for a correlation between source addresses and physical interfaces. Thus, at a very granular level, the latency measurements can be analyzed to discover which specific interface is associated with the most latency. The physical link connected to that specific interface may then be inspected to determine what may be the cause of its relatively high latency. For instance, the link may traverse more physical interconnections than others of the links connecting to network device 510. The link may also be of a lower quality than other links, physically longer than other links, or it may travel through other network devices. In any case, the physical link can be inspected and potentially restored or otherwise altered to remedy the disparities causing or contributing to the inconsistent latencies.

Figure 7:
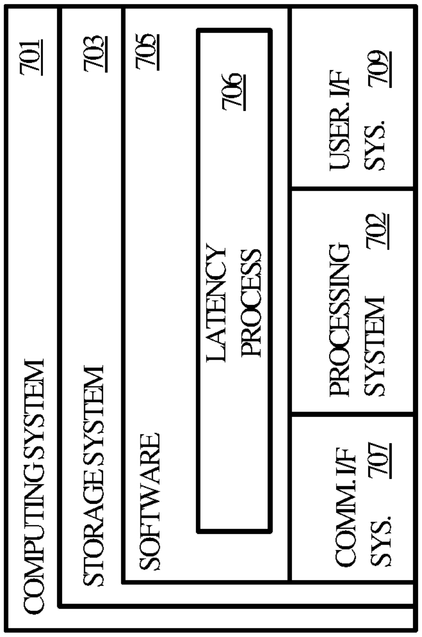
FIG. 7 illustrates a computing system suitable for implementing the various operational environments, architectures, processes, scenarios, and sequences discussed below with respect to the other Figures.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, routers, and any other type of network device, including combinations and variations thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements latency process 706, which is representative of the latency processes discussed with respect to the preceding Figures, such as latency process 200. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 comprises a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 comprises any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including latency process 706) may be implemented in program instructions and among other functions may, when executed by processing system 702, direct processing system 702 to operate as described with respect to the various operational scenarios, sequences, and processes illustrated herein. For example, software 705 may include program instructions for implementing a latency process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to latency discovery and analysis. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
- one or more computer readable storage media;
- one or more processors operatively coupled with the one or more computer readable storage media; and
- program instructions stored on the one or more computer readable storage media that, when executed by the one or more processors, direct the computing apparatus to at least:
  - generate test traffic comprising encapsulated packets to transmit along a route from a source device to a destination device, wherein the test traffic is configured to enable measurement of latencies of the encapsulated packets and an amount of jitter in the latencies by traversing each interface of a bundle of interfaces at least once;
  - supply the test traffic to the bundle of interfaces of the source device to transmit to the destination device over multiple physical links of the route, wherein each physical link of the multiple physical links has physical routing distinct from the other physical links of the multiple physical links;
  - identify the latencies of the encapsulated packets separately for each physical link of the multiple physical links of the route;
  - monitor the amount of jitter in the latencies of the encapsulated packets;
  - identify an occurrence of inconsistent latency with respect to the bundle of interfaces based on the amount of jitter; and
  - flag, based on the inconsistent latency, at least one physical link of the multiple physical links as traversing a different physical routing path than the other physical links of the multiple physical links in the bundle.

2. The computing apparatus of claim 1 wherein, to supply the test traffic to the bundle of interfaces of the source device, the program instructions direct the computing apparatus to supply the test traffic to a load balancing module internal to the source device that distributes the test traffic across the bundle of interfaces based at least in part on a source address of the encapsulated packets.

3. The computing apparatus of claim 2 wherein the program instructions further direct the computing apparatus to vary the source address of the encapsulated packets to affect a broad distribution of the encapsulated packets across the bundle of interfaces.

4. The computing apparatus of claim 3 wherein, to vary the source address of the encapsulated packets, the program instructions direct the computing apparatus to vary a last octet of the source address of each of the encapsulated packets.

5. The computing apparatus of claim 4 wherein each of the encapsulated packets comprises multiple packets encapsulated within each other, wherein the multiple packets include an outermost packet and an innermost packet, and wherein each of the multiple packets includes a different destination address relative to each other of the multiple packets.

6. The computing apparatus of claim 5 wherein a destination address of the innermost packet comprises a network address of the source device, and wherein a destination address of the outermost packet comprises a network address of a next device along the route.

7. The computing apparatus of claim 1 wherein the program instructions further direct the computing apparatus to, to identify the occurrence of the inconsistent latency with respect to the bundle of interfaces based on the amount of jitter, determine that the amount of jitter exceeds a threshold amount of jitter.

8. The computing apparatus of claim 1 wherein the test traffic comprises Internet protocol (IP) packets, and wherein the encapsulated packets comprise IP-in-IP packets.

9. One or more computer readable storage media having program instructions stored thereon that, when executed by one or more processors, direct a computing apparatus to:

generate test traffic comprising encapsulated packets to transmit along a route from a source device to a destination device, wherein the test traffic is configured to enable measurement of latencies of the encapsulated packets and an amount of jitter in the latencies by traversing each interface of a bundle of interfaces at least once;

supply the test traffic to the bundle of interfaces of the source device to transmit to the destination device over multiple physical links of the route, wherein each physical link of the multiple physical links has physical routing distinct from the other physical links of the multiple physical links;

identify the latencies of the encapsulated packets separately for each physical link of the multiple physical links of the route;

monitor the amount of jitter in the latencies of the encapsulated packets;

identify an occurrence of inconsistent latency with respect to the bundle of interfaces based on the amount of jitter; and flag, based on the inconsistent latency, at least one physical link of the multiple physical links as traversing a different physical routing path than the other physical links of the multiple physical links in the bundle.

10. The one or more computer readable storage media of claim 9 wherein the test traffic comprises Internet protocol (IP) packets, and wherein the encapsulated packets comprise IP-in-IP packets.

11. A method for detecting inconsistent latency in a network, the method comprising:

generating test traffic comprising encapsulated packets to transmit along a route from a source device to a destination device, wherein the test traffic is configured to enable measurement of latencies of the encapsulated packets and an amount of jitter in the latencies by traversing each interface of a bundle of interfaces at least once;

supplying the test traffic to a bundle of interfaces of the source device to transmit to the destination device over multiple physical links of the route, wherein each physical link of the multiple physical links has physical routing distinct from the other physical links of the multiple physical links;

identifying the latencies of the encapsulated packets separately for each physical link of the multiple physical links of the route;

monitoring the amount of jitter in the latencies of the encapsulated packets;

identifying an occurrence of inconsistent latency with respect to the bundle of interfaces based on the amount of jitter; and flagging, based on the inconsistent latency, at least one physical link of the multiple physical links as traversing a different physical routing path than the other physical links of the multiple physical links in the bundle.

12. The method of claim 11 wherein supplying the test traffic to the bundle of interfaces of the source device comprises supplying the test traffic to a load balancing module internal to the source device and distributing the test traffic across the bundle of interfaces based at least in part on a source address of the encapsulated packets.

13. The method of claim 12 further comprising varying the source address of the encapsulated packets to affect a broad distribution of the encapsulated packets across the bundle of interfaces.

14. The method of claim 13 wherein varying the source address of the encapsulated packets comprises varying a last octet of the source address of each of the encapsulated packets.

15. The method of claim 14 wherein each of the encapsulated packets comprises multiple packets encapsulated within each other, wherein the multiple packets include an outermost packet and an innermost packet, and wherein each of the multiple packets includes a different destination address relative to each other of the multiple packets.

16. The method of claim 15 wherein a destination address of the innermost packet comprises a network address of the source device, and wherein a destination address of the outermost packet comprises a network address of a next device along the route.

17. The method of claim 11 wherein identifying the occurrence of inconsistent latency with respect to the bundle of interfaces based on the amount of jitter comprises determining that the amount of jitter exceeds a threshold amount of jitter.

18. The method of claim 17 wherein the threshold amount of jitter comprises five (5) milliseconds.

19. The method of claim 11 wherein the test traffic comprises Internet protocol (IP) packets, and wherein the encapsulated packets comprise IP-in-IP packets.

20. The method of claim 11 wherein the source device comprises a router and wherein the multiple physical links comprise multiple distinct fiber optic connections.

* * * * *